United States Patent [19]

Takarada et al.

[11] Patent Number: 5,256,754

[45] Date of Patent: Oct. 26, 1993

[54] HYDROGENPOLYSILOXANES AND METHODS OF MAKING

[75] Inventors: Mitsuhiro Takarada; Yuji Yoshikawa; Kenichi Isobe, all of Annaka, Japan

[73] Assignee: Shin-Etsu Chemical Co., Ltd., Tokyo

[21] Appl. No.: 867,464

[22] Filed: Apr. 13, 1992

Related U.S. Application Data

[62] Division of Ser. No. 785,770, Oct. 31, 1991, abandoned.

[30] Foreign Application Priority Data

Oct. 31, 1990 [JP] Japan ................................. 2-294963

[51] Int. Cl.$^5$ .......................................... C08G 77/10
[52] U.S. Cl. ........................................ 528/31; 528/32; 528/34; 528/37; 528/23; 556/440; 556/451
[58] Field of Search .................. 556/440, 451; 528/15, 528/31, 25, 23, 32, 34, 37

[56] References Cited

U.S. PATENT DOCUMENTS

| | | | |
|---|---|---|---|
| 4,011,247 | 3/1977 | Sato et al. | 260/348.56 |
| 4,448,927 | 5/1984 | Falender et al. | 524/860 |
| 4,482,670 | 11/1984 | Saam et al. | 524/860 |
| 4,503,208 | 3/1985 | Lin et al. | 528/15 |
| 4,554,339 | 11/1985 | Hockemeyer et al. | 528/26 |
| 4,585,669 | 4/1986 | Eckberg | 427/54.1 |
| 4,597,987 | 7/1986 | Hockemeyer et al. | 427/54.1 |
| 4,680,365 | 7/1987 | Muller et al. | 528/15 |
| 4,701,503 | 10/1987 | Sato | 525/478 |
| 4,906,718 | 3/1990 | Gornowicz et al. | 528/15 |
| 5,039,761 | 8/1991 | Oho et al. | 525/479 |
| 5,045,621 | 9/1991 | Suzuki | 528/14 |
| 5,162,480 | 11/1992 | Schilling, Jr. et al. | 528/23 |

FOREIGN PATENT DOCUMENTS 0097333 1/1984 European Pat. Off. .

OTHER PUBLICATIONS

Patent Abstracts of Japan, vol. 6, No. 35 (C-93) (913), Mar. 3, 1982.

*Primary Examiner*—Melvyn I. Marquis
*Assistant Examiner*—M. Glass
*Attorney, Agent, or Firm*—Birch, Stewart, Kolasch & Birch

[57] ABSTRACT

Hydrogenpolysiloxanes having a (meth)acryloxypropyl group on a side chain are useful intermediates. They are prepared by equilibration reaction of siloxane compounds.

4 Claims, 3 Drawing Sheets

HYDROGENPOLYSILOXANES AND METHODS OF MAKING

This application is a divisional of copending application Ser. No. 07/785,770, filed on Oct. 31, 1991, now abandoned.

This invention relates to hydrogenpolysiloxanes and methods for preparing the same.

BACKGROUND OF THE INVENTION

Mixtures of tetramethyldisiloxane or hexamethyldisiloxane, octamethylcyclotetrasiloxane, and hexamethylcyclotetrasiloxane can be converted into both terminal and side chain hydrogenpolysiloxanes or side chain hydrogenpolysiloxanes through acid equilibration. These hydrogenpolysiloxanes react with various alkenes in the presence of platinum catalysts to provide corresponding addition products. However, hydrogenpolysiloxanes having (meth)acryl side chains and terminated with hydrogen at each end are not known in the art. In addition, although methyl side chain hydrogenpolysiloxanes can be readily converted to addition products through addition reaction of allyl (meth)acrylate to some Si—H bonds thereof, no reports have been found with respect to methylphenyl-containing hydrogenpolysiloxanes. This is because phenyl-containing siloxanes are equilibrated with alkali catalysts and thus reject the use of Si—H compounds.

In the prior art, α-methylstyrene was generally used in order to incorporate an aromatic substituent into hydrogenpolysiloxanes, but the resulting siloxanes are less resistant against weather and not recommended for use where they are exposed to ultraviolet light and sunlight. Unless an aromatic substituent is introduced, polysiloxanes remain low in compatibility and reactivity with organic resins. Therefore, there is a need for a reactive polysiloxane containing a proper content of phenyl group as a modifier for organic resins.

From the past, organopolysiloxanes having an organic functional group were widely used as resin modifiers in the fields of paint, molding materials, medical materials, and coating materials for the purpose of imparting useful properties such as heat resistance, weather resistance, mold release, formability and thermal impart to organic resins.

There were known various organopolysiloxanes having an organic functional group, for example, dimethylpolysiloxane having an alcoholic hydroxyl group at either end (see Japanese Patent Publication No. 8718/1979), dimethylpolysiloxane having a functional group at either end (see Japanese Patent Application Kokai Nos. 217515/1983 and 123502/1984), methylpolysiloxane having a functional group on a side chain (see Japanese Patent Publication Nos. 18968/1986 and 288808/1986), and methylphenylpolysiloxane having an alcoholic hydroxyl group at either end and on a side chain. All these organopolysiloxanes have the same functional groups in their molecule and no polysiloxanes having different functional groups in a molecule have been proposed. The organopolysiloxanes having the same functional groups in their molecule possess properties corresponding to the respective functional groups.

There is a need for an organopolysiloxane which is more compatible with organic resins and more effective as a resin modifier than the conventional organopolysiloxanes.

SUMMARY OF THE INVENTION

The inventors have discovered that by effecting equilibration reaction among compounds of formulae (3), (4), and (5):

(3)

(4)

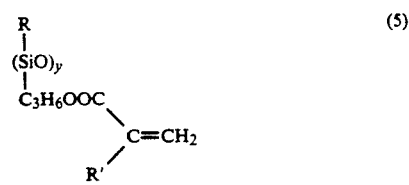

(5)

wherein R is independently an alkyl group having 1 to 6 carbon atoms or phenyl group, R' is a hydrogen atom or methyl group, and x and y are integers of from 3 to 10, preferably in the presence of an acid, especially conc. sulfuric acid or trifluoromethanesulfonic acid, there are readily obtained polysiloxanes terminated with hydrogen at each end and having a (meth)acryl side chain. By hydrosilylating both terminal hydrogen groups of the polysiloxanes with an alkene having a non-acrylic functional group, there are obtained hetero-functional polysiloxanes. The (meth)acryl group of these hetero-functional polysiloxanes is copolymerizable with other radical-polymerizable monomers to form silicone-acryl copolymers which are improved in curing nature and compatibility with other organic resins due to the presence of the functional group.

Similarly, the inventors have discovered that by effecting equilibration reaction among compounds of formulae (10), (11), (8), and (9):

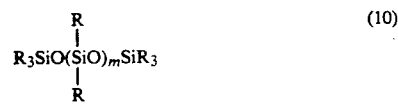

(10)

(11)

(8)

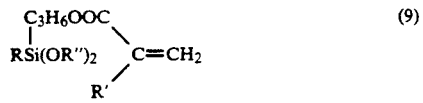

(9)

wherein R and R' are as defined above, R" is a methyl or ethyl group, m is an integer of from 0 to 100, and n is an integer of from 1 to 100, and water, in the presence of an acid, preferably conc. sulfuric acid or trifluoromethanesulfonic acid, there are obtained polysiloxanes containing desired moles of a (meth)acryloxypropyl group. A phenyl group can be incorporated by using $(C_6H_5)_2Si(OCH_3)_2$ as formula (8) compound. By subjecting these phenyl group-containing hydrogenpolysiloxanes to addition reaction with alkenes having a functional group, there are obtained radical-polymerizable macromolecular polymers which are highly compatible with organic resins. The present invention is based on these findings.

Therefore, in one form of the present invention, there is provided a hydrogenpolysiloxane having a (meth)acryloxypropyl group of the following average composition formula (1):

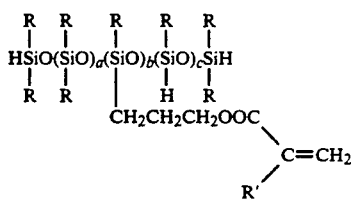

wherein R is independently an alkyl group having 1 to 6 carbon atoms or phenyl group, R' is a hydrogen atom or methyl group, and letters a, b and c are positive numbers within the range: $0 \leq a \leq 20$, $0 < b \leq 3$, and $0 \leq c \leq 10$, In a second form of the invention, there is provided a hydrogenpolysiloxane having a (meth)acryloxypropyl group of the following average composition formula (2):

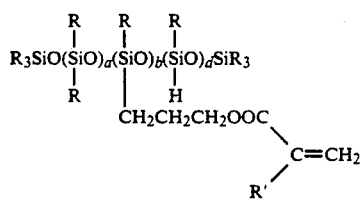

wherein R, R', a, and b are as defined above, and d is a positive number within the range: $1 \leq d \leq 10$.

In a third form, a hydrogenpolysiloxane of formula (1) is produced by effecting equilibration reaction of compounds of the following formulae (3), (4), (5), and (6):

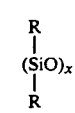

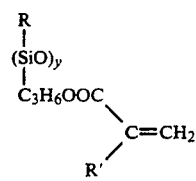

wherein R and R' are as defined above, and x, y, and z are integers of from 3 to 10.

In a fourth form, a hydrogenpolysiloxane of formula (2) is produced by effecting equilibration reaction of compounds of the following formulae (7), (4), (5), and (6):

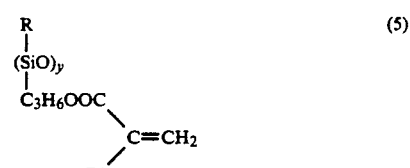

wherein R, R', x, y, and z are as defined above.

In a fifth form, a hydrogenpolysiloxane of formula (1) is produced by effecting hydrolysis and equilibration reaction among compounds of the following formulae (3), (8), (9), and (6):

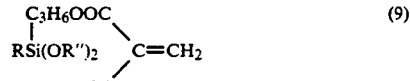

wherein R, R', and z are as defined above, and R" is a methyl or ethyl group and water.

In a sixth form, a hydrogenpolysiloxane of formula (2) is produced by effecting hydrolysis and equilibration reaction among (A) compounds of the following formulae (7), (8), (9), and (6):

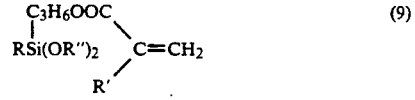

wherein R, R', R", and z are as defined above and water or (B) compounds of the following formulae (10), (11), (8), and (9):

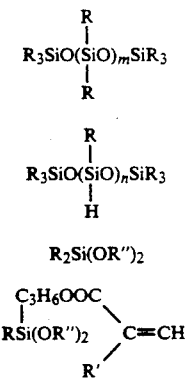

(10) $$R_3SiO(SiO)_mSiR_3 \text{ with R substituents}$$

(11) $$R_3SiO(SiO)_nSiR_3 \text{ with R and H substituents}$$

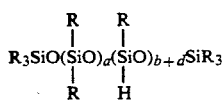

(8) $R_2Si(OR'')_2$ (9) $RSi(OR'')_2-C_3H_6OOC-C(R')=CH_2$ wherein R, R', R'', m and n are as defined above and water.

In a seventh form, a hydrogenpolysiloxane of formula (2) is produced by effecting addition reaction of allyl acrylate or methacrylate to a hydrogensiloxane of the following average composition formula (12):

(12) $$R_3SiO(SiO)_a(SiO)_{b+d}SiR_3 \text{ with R and H substituents}$$

wherein R, a, b, and d are as defined above.

DETAILED DESCRIPTION OF THE INVENTION

Figure 1:
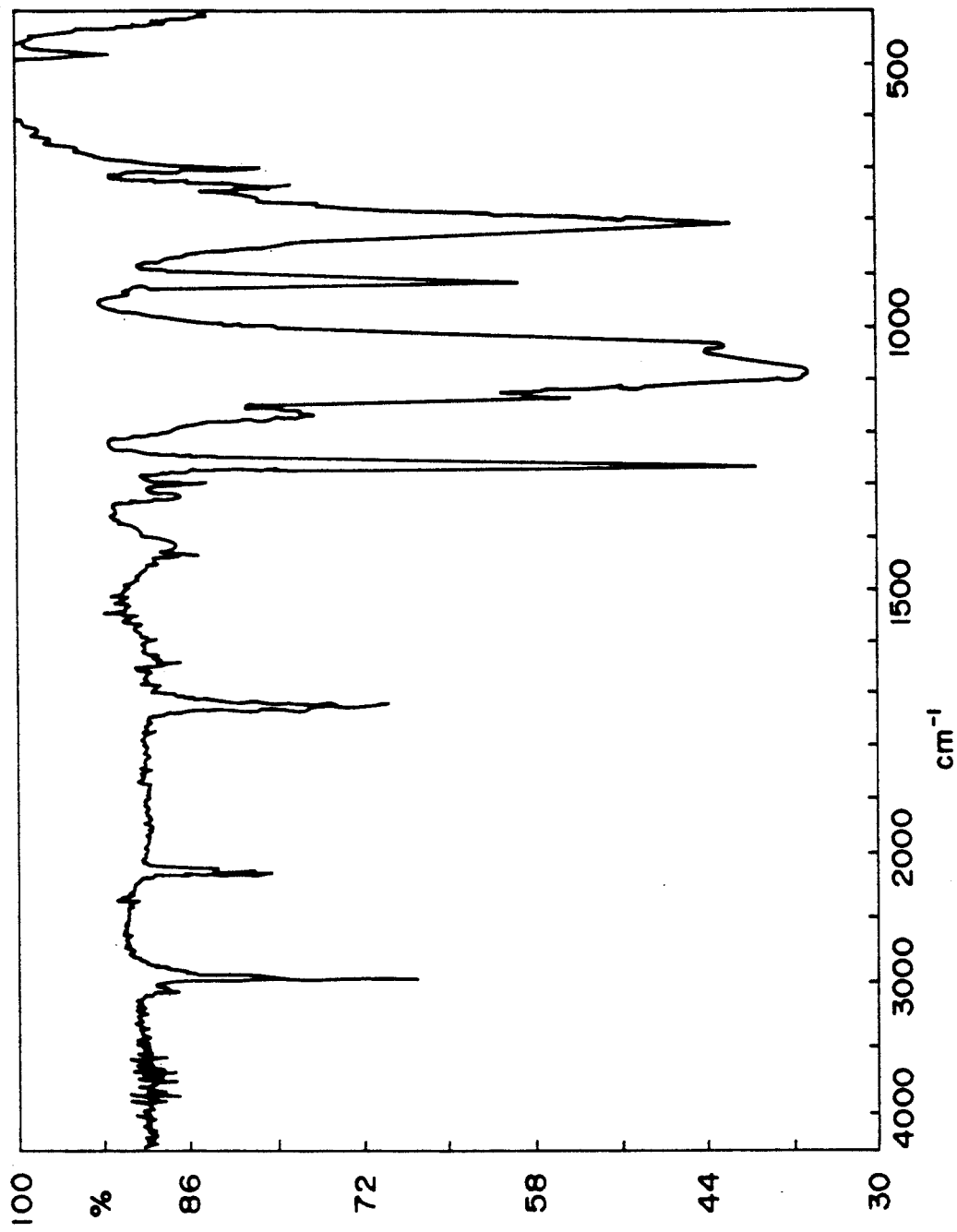
FIGS. 1 to 3 are IR absorption spectra of hydrogenpolysiloxane of the present invention.

The present invention provides hydrogenpolysiloxanes of the following average composition formulae (1) and (2).

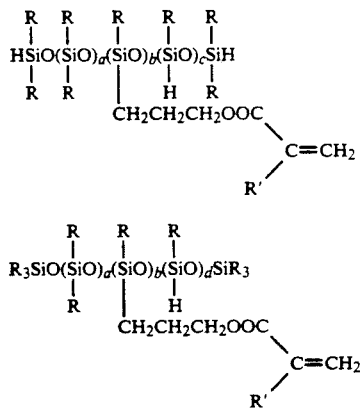

wherein R is independently an alkyl group having 1 to 6 carbon atoms or phenyl group, R' is a hydrogen atom or methyl group, and letters a, b, c, and d are numbers within the range: $0 \leq a \leq 20$, $0 < b \leq 3$, $0 \leq c \leq 10$, and $1 \leq d \leq 10$.

More particularly, R is an alkyl group having 1 to 6 carbon atoms such as methyl, ethyl and propyl groups or a phenyl group, with the methyl and phenyl groups being preferred for commercial purposes. Preferably, both methyl and phenyl groups are used together. For example, by incorporating a diphenylsiloxane or methylphenylsiloxane unit into a siloxane having a dimethylsiloxane unit in the backbone, there can be obtained an organopolysilane which is further improved in reactivity and compatibility with organic resins. Letters a, b, c, and d are within the above-defined range. As the siloxane chain becomes longer (a, b, c, and d in excess of their upper limit), the siloxane becomes higher in viscosity, more difficult to handle, and less compatible with organic resins.

The (meth)acryloxypropyl-containing hydrogenpolysiloxanes of the present invention possess both a radicalpolymerizable acryl or methacryl group and a Si—H bond capable of addition reaction with various olefins in the presence of a platinum catalyst. They can be readily synthesized in high yields by the following methods.

A hydrogenpolysiloxane of formula (1) can be produced by equilibrating compounds of the following formulae (3), (4), (5), and (6).

(3) $HSiOSiH$ with R substituents

(4) $(SiO)_x$ with R substituents

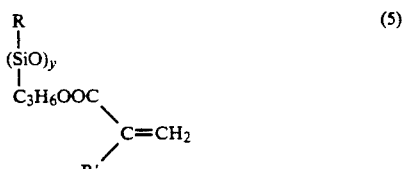

(5) $(SiO)_y$ with R and $C_3H_6OOC-C(R')=CH_2$ substituents

(6) $(SiO)_z$ with R and H substituents

In the formulae, R and R' are as defined above, and x, y, and z are integers of from 3 to 10.

The starting reactants are obtained by hydrolysis of chlorosilane or alkoxysilanes and are available as general-purpose raw materials in the silicone industry.

The catalyst for equilibration is conc. sulfuric acid or trifluoromethanesulfonic acid. Such a catalyst is added in an amount of about 0.5 to 20% by weight of the total of the reactants whereupon equilibration takes place to completion within about 2 to 20 hours at room temperature or lower temperatures, preferably a temperature of 0° to 20° C. The rate of equilibration reaction would be slow with less than 0.5% by weight of the catalyst whereas the (meth)acryl group can be decomposed with more than 20% by weight of the catalyst.

After the completion of equilibration, the compound of formula (1) may be recovered by conventional procedures, for example, by water washing.

Alternatively, the compound of formula (1) can be readily produced through acid equilibration of a mixture of compounds of the following formulae (3), (8), (9), and (6) in a similar manner to the above procedure.

$$\begin{array}{cc} R & R \\ | & | \\ HSiOSiH \\ | & | \\ R & R \end{array} \quad (3)$$

$$R_2Si(OR'')_2 \quad (8)$$

$$\begin{array}{c} C_3H_6OOC \\ | \\ RSi(OR'')_2 \end{array} \diagdown C=CH_2 \diagup R' \quad (9)$$

$$\begin{array}{c} R \\ | \\ (SiO)_z \\ | \\ H \end{array} \quad (6)$$

In the formulae, R" is a methyl or ethyl group and z is an integer of from 3 to 10.

A choice among diphenyldimethoxysilane, diphenyldiethoxysilane, methylphenyldimethoxysilane, and methylphenyldiethoxysilane as the compound of formula (8) results in an organohydrogenpolysiloxane having a dimethylsiloxane or methylphenylsiloxane unit introduced into the backbone thereof, which is more compatible with organic resins so that it can be uniformly blended with organic resins while enhancing the heat resistance of organic resins after blending.

On the other hand, the compound of formula (2) can be produced through acid equilibration of a mixture of compounds of the following formulae (7), (4), (5), and (6) as in the above procedure for the compound of formula (1).

$$R_3SiOSiR_3 \quad (7)$$

$$\begin{array}{c} R \\ | \\ (SiO)_x \\ | \\ R \end{array} \quad (4)$$

$$\begin{array}{c} R \\ | \\ (SiO)_y \\ | \\ C_3H_6OOC \end{array} \diagdown C=CH_2 \diagup R' \quad (5)$$

$$\begin{array}{c} R \\ | \\ (SiO)_z \\ | \\ H \end{array} \quad (6)$$

Alternatively, the compound of formula (2) can be produced through acid equilibration of a mixture of compounds of the following formulae (7), (8), (9), and (6) and water or a mixture of compounds of the following formulae (10), (11), (8), and (9) and water.

$$R_3SiOSiR_3 \quad (7)$$

$$R_2Si(OR'')_2 \quad (8)$$

$$\begin{array}{c} C_3H_6OOC \\ | \\ RSi(OR'')_2 \end{array} \diagdown C=CH_2 \diagup R' \quad (9)$$

-continued $$\begin{array}{c} R \\ | \\ R_3SiO(SiO)_mSiR_3 \\ | \\ R \end{array} \quad (10)$$

$$\begin{array}{c} R \\ | \\ R_3SiO(SiO)_nSiR_3 \\ | \\ H \end{array} \quad (11)$$

In the formulae, m is an integer of from 0 to 100 and n is an integer of from 1 to 100.

In a further alternative method, the compound of formula (2) can be produced by effecting addition reaction of allyl arcylate or methacrylate to a hydrogensiloxane of the following average composition formula (12).

$$\begin{array}{cc} R & R \\ | & | \\ R_3SiO(SiO)_a(SiO)_{b+d}SiR_3 \\ | & | \\ R & H \end{array} \quad (12)$$

This addition reaction or hydrosilylation is preferably carried out in the presence of a platinum catalyst. Any desired one of well-known platinum catalysts for hydrosilylation may be used. For commercial purposes, chloroplatinic acid is preferred in that addition reaction can be completed by heating at a temperature of about 60° C. to 120° C. for about 2 to 8 hours. The platinum catalyst is used in a catalytic amount, often about 2 to 400 ppm based on the weight of the hydrogensiloxane.

Reaction may be carried out in suitable solvents, for example, aromatic hydrocarbon solvents such as benzene, toluene and xylene and aliphatic hydrocarbon solvents such as hexane, heptane, and octane for controlling the reaction system viscosity and reaction temperature.

The (meth)acryloxypropyl-containing hydrogenpolysiloxanes of the present invention produced as above can undergo addition reaction with various olefins in the presence of a platinum catalyst, yielding corresponding addition products. For instance, by adding functional group-containing alkenes such as allyl glycidyl ether, allyl alcohol, and allyl glycol, there are synthesized hetero-functional polysiloxanes having a (meth)acryl group and another functional group in a molecule, represented by the formula:

$$\begin{array}{cccc} R & R & R & R \\ | & | & | & | \\ XSiO(SiO)_a(SiO)_bSiX \\ | & | & | & | \\ R & R & Y & R \end{array}$$

wherein Y is 3-acryloxypropyl or 3-methacryloxypropyl group, X is selected from 3-glycidoxypropyl, 2-(3',4'-epoxycyclohexyl)ethyl, 3-hydroxypropyl, and 3-(2'-hydroxyethoxy)propyl groups, R is an alkyl group having 1 to 6 carbon atoms or phenyl group, and letters a and b are positive numbers within the range: $1 \leq a \leq 20$ and $1 \leq b \leq 10$.

These hetero-functional polysiloxanes are commercially useful materials as functional group-containing, radical-polymerizable macromolecular polymers because they are copolymerizable with other polymerizable monomers such that the resulting resins may exhibit the flexibility, heat resistance, adhesion, water repellency and thermal impact inherent to acrylic resins.

Since the (meth)acryloxypropyl-containing hydrogenpolysiloxanes of the present invention can be copolymerized with other polymerizable monomers to produce Si—H containing acrylic polymers, the hydrogenpolysiloxanes are also effective crosslinking agents for unsaturated group-containing polymers in the presence of platinum.

According to the present invention, a both end hydrogen-terminated organopolysiloxane is obtained by effecting equilibration between a hydrolysate of a (meth)acryloxypropylmethyldialkoxysilane and tetramethyldisiloxane. Especially, a both end hydrogen-terminated polysiloxane containing a phenyl group and a (meth)acryl group is obtained by adding alkali equilibration ring-opened products of octaphenylcyclotetrasiloxane and octamethyltetrasiloxane during equilibration. Therefore, the organohydrogenpolysiloxanes of the present invention are useful intermediates for the synthesis of hetero-functional polysiloxanes. That is, by subjecting the organohydrogenpolysiloxanes to addition reaction with alkenes having a non-acrylic functional group, there are obtained corresponding hetero-functional polysiloxanes having an adjustable phenyl content and (meth)acryl content which are useful modifiers for acrylic resins.

EXAMPLE

Examples of the present invention are given below by way of illustration and not by way of limitation.

EXAMPLE 1

A flask was charged with 13.4 grams of 1,1,3,3-tetramethyldisiloxane, 37.0 grams of octamethylcyclotetrasiloxane, 36.4 grams of methylphenyldimethoxysilane, and 18.6 grams of a hydrolysate of 3-methacryloxypropylmethyldimethoxysilane whose major component corresponded to the following formula.

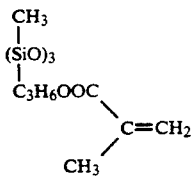

After the system was cooled to 5° C., 5.3 grams of trifluoromethanesulfonic acid was admitted, and 1.9 grams of water was then added. The reaction mixture was agitated for 12 hours at 5° to 10° C., washed three times with water, and finally concentrated at 50° to 60° C. in a vacuum of about 10 mmHg, thereby isolating 93.3 grams (yield 97%) of an equilibration product.

Measurement of physical properties identified the product to have the following composition formula.

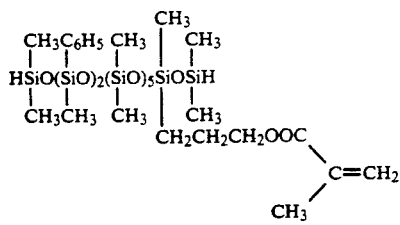

The product showed the physical properties reported in Table 1 and the infrared absorption spectrum shown in FIG. 1.

EXAMPLE 2

A flask was charged with 30.2 grams of hydrogenpolysiloxane having the following formula:

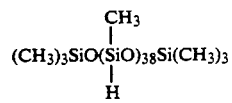

30.4 grams of hexamethyldisiloxane, 48.9 grams of diphenyldimethoxysilane, and 30.2 grams of 3-methacryloxypropylmethyldimethoxysilane. After the system was cooled to 5° C., 6.2 grams of conc. sulfuric acid was admitted, and 6.5 grams of water was then added. The reaction mixture was agitated for 12 hours at 5° to 10° C., washed three times with water, and finally concentrated at 50° to 60° C. in a vacuum of about 10 mmHg, thereby isolating 121.9 grams (yield 98%) of an equilibration product.

Measurement of physical properties identified the product to have the following composition formula.

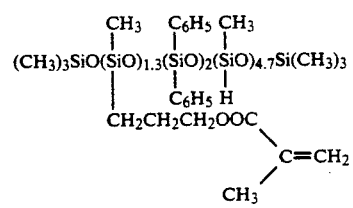

Figure 2:
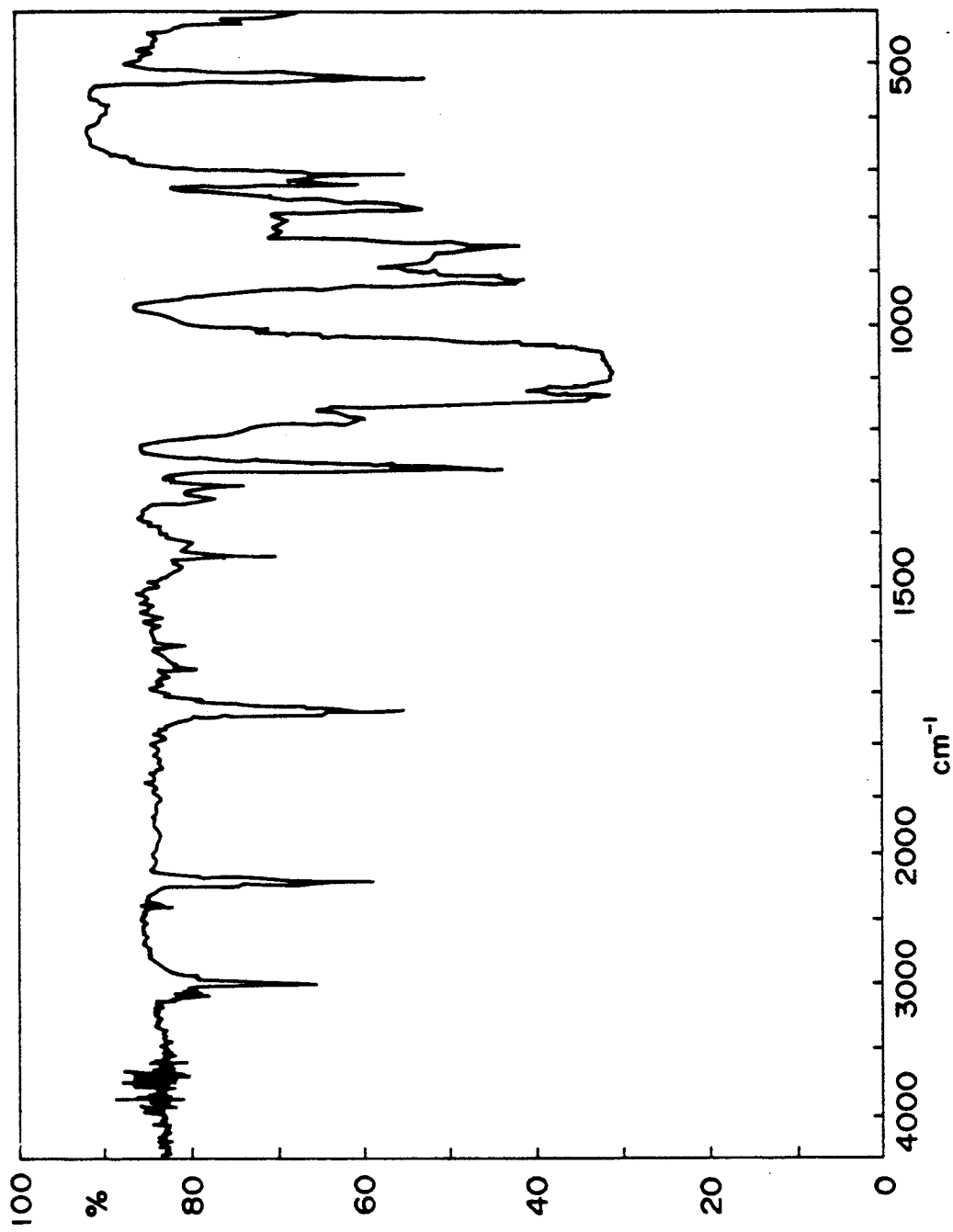

The product showed the physical properties reported in Table 1 and the infrared absorption spectrum shown in FIG. 2.

EXAMPLE 3

A flask was charged with 50 grams of toluene, 6.8 grams of allyl methacrylate, and 0.1 gram of 2% ethanol solution of chloroplatinic acid. To the flask at 80° C., 82.8 grams of hydrogenpolysiloxane of the following average composition formula:

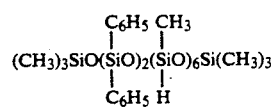

was added dropwise over 2 hours. After the completion of addition the reaction mixture was aged for one hour at 80° C. After the disappearance of the absorption peak (1650 cm$^{-1}$) attributable to the allyl group of allyl methacrylate was confirmed by an IR spectrometer, the reaction mixture was concentrated at 50° to 60° C. in a vacuum of about 10 mmHg. Filtration yielded 86.9 grams (yield 97%) of an addition product.

Measurement of physical properties identified the product to have the following composition formula.

Figure 3:
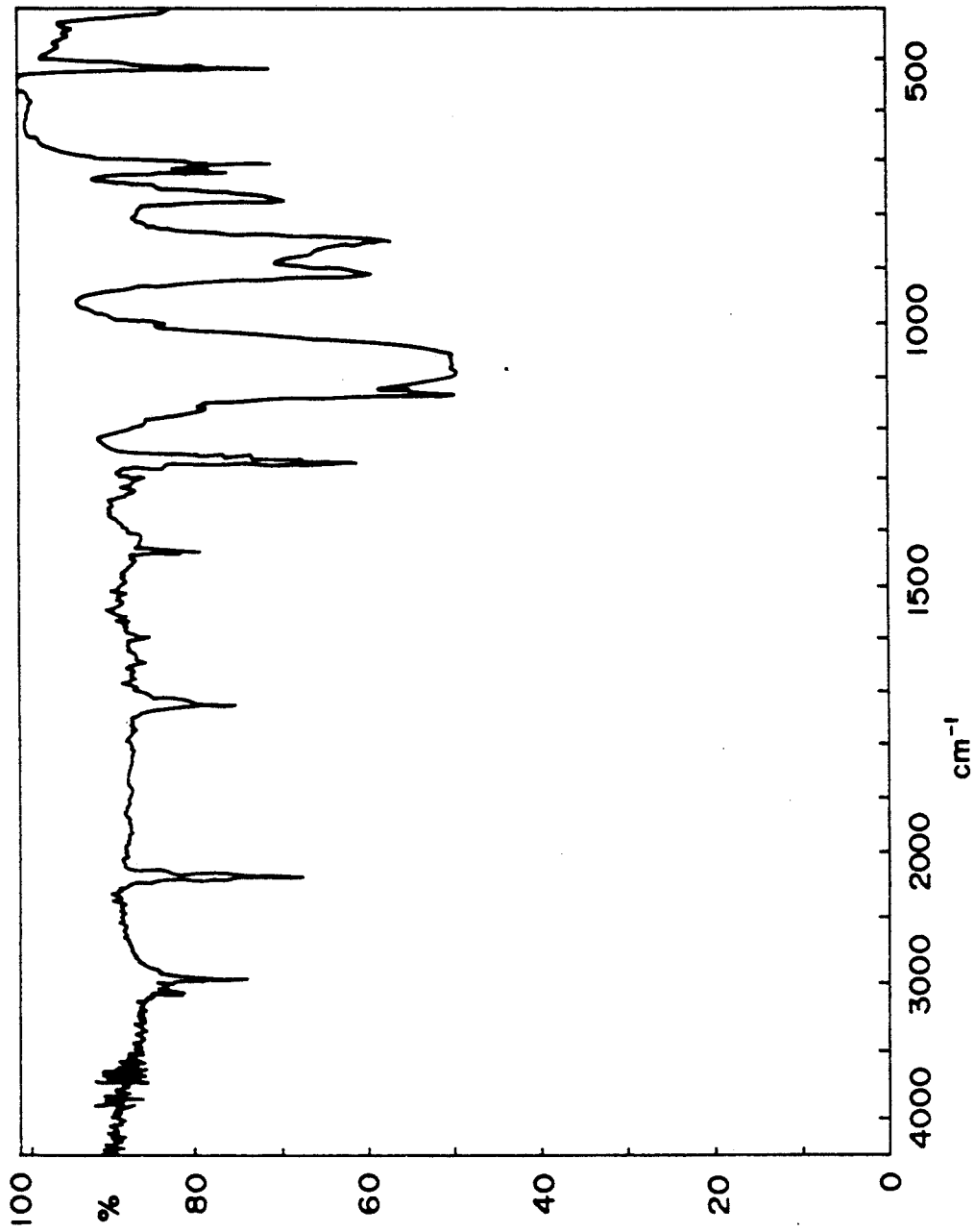

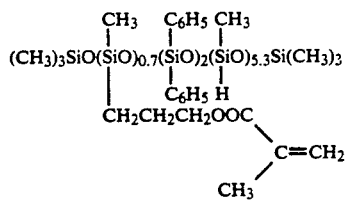

the product showed the physical properties reported in Table 1 and the infrared absorption spectrum shown in FIG. 3.

TABLE 1

| Example No. | 1 | 2 | 3 |
|---|---|---|---|
| Viscosity, cs @25° C. | 10.6 | 27.9 | 21.8 |
| Refractive index @25° C. | 1.4499 | 1.4846 | 1.4841 |
| Protone NMR, δ | 0.1  54 H | 0.1  39.9 | 0.1  38.1 |
| (acetone | 0.7  2 H | 0.6  2.6 | 0.6  1.4 |
| δ = 2 | 1.7  2 H | 1.6  2.6 | 1.7  1.4 |
| standard) | 4.1  2 H | 4.0  2.6 | 4.1  1.4 |
|  | 4.7  2 H | 4.8  4.7 | 4.8  5.3 |
|  | 5.5  1 H | 5.4  1.3 | 5.4  0.7 |
|  | 6.0  1 H | 6.0  1.3 | 6.0  0.7 |
|  | 7.5  10 H | 7.3  2.0 | 7.3  20 |
| Elemental analysis*, % | | | |
| C | 45.0 | 50.2 | 49.1 |
|  | (44.86) | (49.98) | (48.93) |
| H | 7.7 | 7.0 | 6.5 |
|  | (7.74) | (6.98) | (6.53) |

*theoretical values in parentheses

REFERENCE EXAMPLE 1

A flask was charged with 100 grams of toluene, 19.7 grams of allyl glycol, and 0.2 gram of 2% ethanol solution of chloroplatinic acid. To the flask at 80° C., 100 grams of hydrogenpolysiloxane of the following average composition formula:

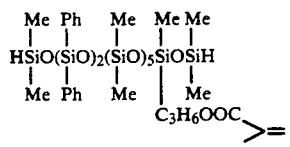

was added dropwise over 2 hours. After the completion of addition, the reaction mixture was aged for 2 hours at 80° C. After the disappearance of the Si—H absorption peak (2130 cm$^{-1}$) was confirmed by an IR spectrometer, the toluene and unreacted reactants were removed by vacuum distillation and filtration, isolating 116.4 grams (yield 98%) of an addition product which was identified to have the following average composition formula.

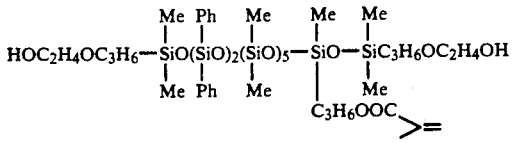

Viscosity: 195 cs at 25° C.
Refractive index: 1.4876 at 25° C.
H$^1$NMR (δ): 0.04 (48H); 0.47 (6H); 1.54 (6H); 3.43 (14H); 5.40 (1H); 5.98 (1H); 7.27 (20H).
Elemental analysis: Found: C 52.2% H 7.5%; Calcd.: C 52.1% H 7.6%.

REFERENCE EXAMPLE 2

The procedure of Reference Example 1 was repeated except that 22.0 grams of ally glycidyl ether was used instead of 19.7 grams of allyl glycol. There was obtained 119.8 grams (yield 99%) of an addition product which was identified to have the following average composition formula.

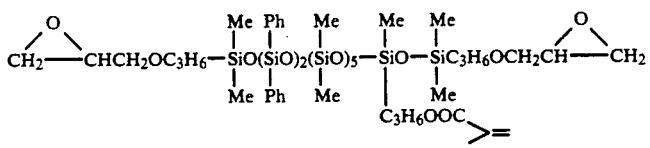

Viscosity: 450 cs at 25° C.
Refractive index: 1.4846 at 25° C.
H$^1$-NMR (δ): 0.07 (48H); 0.48 (6H); 1.57 (6H); 2.38 (2H); 2.54 (2H); 3.33 (2H); 5.37 (1H); 5.97 (1H); 7.22 (20H).
Elemental analysis: Found: C 53.1% H 7.3%; Calcd.: C 52.9% H 7.5%.

Although some preferred embodiments have been described, many modifications and variations may be made thereto in the light of the above teachings. It is therefore to be understood that within the scope of the appended claims, the invention may be practiced otherwise than as specifically described.

We claim:
1. A method for producing a hydrogenpolysiloxane having a (meth)acryloxypropyl group of the following average composition formula (1):

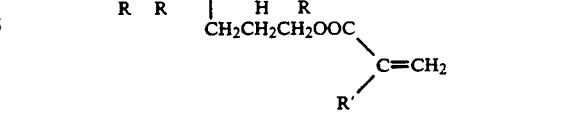

wherein
R is an alkyl group having 1 to 6 carbon atoms or phenyl group,
R' is a hydrogen atom or methyl group, and letters a, b, and c are positive numbers within the range: 0<a<20, 0<b<3, and 0<c<10, comprising the step of effecting equilibration reaction of compounds of the following formulae (3), (4), (5), and (6):

(3)

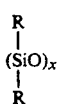

(4)

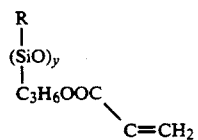

(5)

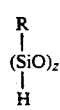

(6)

wherein x, y, and z are integers of from 3 to 10.

2. A method for producing a hydrogenpolysiloxane having a (meth)acryloxypropyl group of the following average composition formula (2):

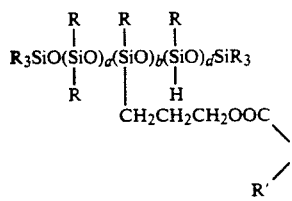

(2)

wherein
R is an alkyl group having 1 to 6 carbon atoms or phenyl group,
R' is a hydrogen atom or methyl group, and
letters a, b, and d are positive numbers within the range: $0<a<20$, $0<b<3$, and $1<d<10$, comprising the step of effecting equilibration reaction of compounds of the following formulae (7), (4), (5), and (6):

R$_3$SiOSiR$_3$  (7)

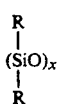

(4)

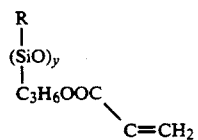

(5)

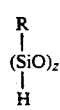

(6)

wherein x, y, and z are integers of from 3 to 10.

3. A method for producing a hydrogenpolysiloxane having a (meth)acryloxypropyl group of the following average composition formula (1):

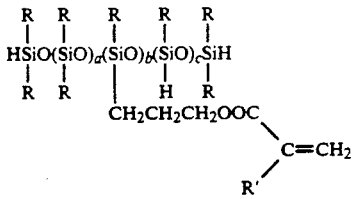

(1)

wherein
R is an alkyl group having 1 to 6 carbon atoms or phenyl group,
R' is a hydrogen atom or methyl group, and letters a, b, and c are positive numbers within the range: $0<a<20$, $0<b<3$, and $0<c<10$, comprising the step of effecting hydrolysis and equilibration reaction among compounds of the following formulae (3), (8), (9), and (6):

(3)

R$_2$Si(OR'')$_2$  (8)

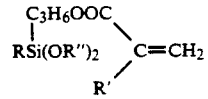

(9)

(6)

wherein R'' is a methyl or ethyl group, and z is an integer of from 3 to 10 and water.

4. A method for producing a hydrogenpolysiloxane having a (meth)acryloxypropyl group of the following average composition formula (2):

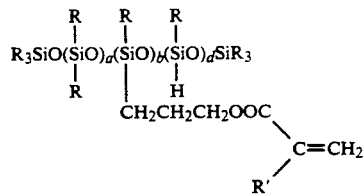

(2)

wherein
R is an alkyl group having 1 to 6 carbon atoms or phenyl group,
R' is a hydrogen atom or methyl group, and
letters a, b, and d are positive numbers within the range: $0<a<20$, $0<b<3$, and $1<d<10$, comprising the step of effecting hydrolysis and equilibration reaction of compounds (A) compounds of the following formulae (7), (8), (9), and (6):

R$_3$SiOSiR$_3$  (7)

R$_2$Si(OR'')$_2$  (8)

-continued
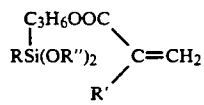         (9)
         (6)
wherein R and R' are as defined in claim 2, R" is a methyl or ethyl group, and z is an integer of from 3 to 10 and water or (B) compounds of the following formulae (10), (11), (8), and (9):
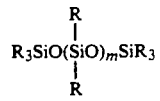         (10)
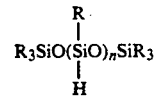         (11)
$R_2Si(OR")_2$         (8)
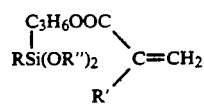         (9)
wherein R, R', and R" are as defined above, and m is an integer of from 1 to 20 and n is an integer of from 1 to 100 and water.
* * * * *